United States Patent [19]

Huang

[11] Patent Number: 5,062,179

[45] Date of Patent: Nov. 5, 1991

[54] HANDLE ASSEMBLY FOR DOLL CARRIAGES

[76] Inventor: Ming-Tai Huang, 4Fl., No. 302, Pai Ling Wu Rd., Taipei, Taiwan

[21] Appl. No.: 667,272

[22] Filed: Mar. 11, 1991

[51] Int. Cl.$^5$ .................... F16C 11/00; E05D 11/10
[52] U.S. Cl. ........................... 16/111 R; 280/47.371;
74/551.3; 403/93; 403/95
[58] Field of Search ................... 16/111 A, 111 R;
280/47.371, 47.38, 650, 47.39; 403/93, 95, 96;
74/551.3, 551.6, 551.7

[56] References Cited

U.S. PATENT DOCUMENTS

| | | | |
|---|---|---|---|
| 729,432 | 5/1903 | Sidway | 403/96 |
| 2,617,670 | 11/1952 | Welsh | 403/95 |
| 3,583,734 | 6/1971 | Magi | 403/96 |
| 4,543,007 | 9/1985 | Quiogue | 403/93 |
| 5,018,405 | 5/1991 | Chiu | 74/551.3 |

FOREIGN PATENT DOCUMENTS 0339890 11/1989 European Pat. Off. ..,...... 280/47.39
255273  1/1949 Switzerland .......................... 403/93

Primary Examiner—Robert L. Spruill
Attorney, Agent, or Firm—Peter L. Michaelson

[57] ABSTRACT

A handle assembly for doll carriages comprises a pair of support rods each defining a first cog seat on an end thereof, a U-shaped angle-adjustable handle defining a second cog seat on a respective end thereof, a spring-biased cog member normally engaged between the first and second cog seats, and an adjusting piece for acting on the cog member. The adjusting piece has a pair of diametrically disposed ridges thereon, and the cog member has a pair of annular wedges thereon in alignment with the ridges. The adjusting piece is turnable to urge the cog member, resisting the force by the spring, to disengage from the second cog seat of the handle, thereby permitting a pivotal movement of the handle with respect to the support rods.

4 Claims, 5 Drawing Sheets

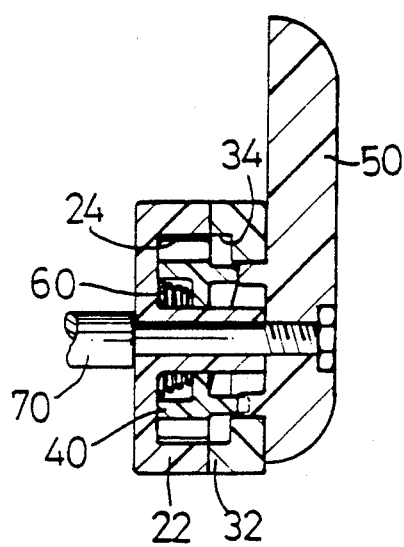
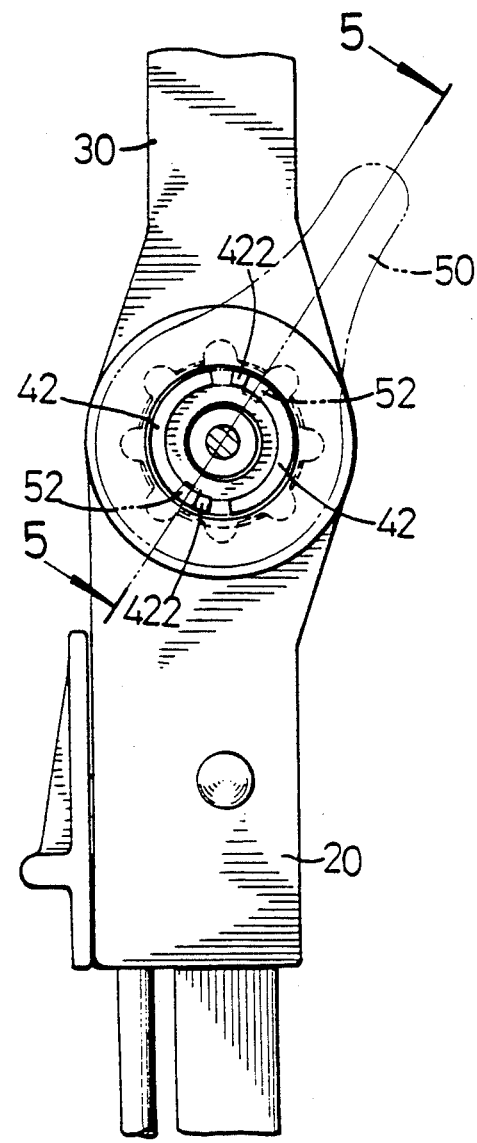
FIG.5
FIG.4

HANDLE ASSEMBLY FOR DOLL CARRIAGES

BACKGROUND OF THE INVENTION

The present invention relates generally to a handle assembly for doll carriages. More particularly, the present invention relates to an angle-adjustable handle assembly for doll carriages in which, for pivotally moving a U-shaped handle relative to a pair of support rods, a pair of adjusting pieces, which are operable to permit the above pivotal movement, can be manipulated to and retained at a desired position in a separate and independent manner, so that the pivotal movement of the U-shaped handle relative to the support rods can be easily performed.

Angle-adjustable handle assemblies for doll carriages in which a U-shaped handle is pivotal about a pair of support rods to suit particular needs are known. Generally, pivotal movement is accomplished by providing a spring-biased cog member between heads of the handle and a corresponding support rod, which form a cog seat therebetween. The cog member is normally engaged with the cog seats on the handle and the support rod so that the handle is prevented from pivotal movement with respect to the support rods. To allow a pivotal movement of the handle relative to the support rods, it is required that the cog member be urged by an adjusting piece to disengage from one of the two cog seats.

In the above handle assembly, since the adjusting piece directly bears against the cog member which in turn is biased by a spring, the force exerted on the adjusting piece that urges the cog member to disengage from one cog seat must be maintained, during pivotal adjustment of the U-shaped handle with respect to the support rods, in order that the cog member will not be forced back, i.e., to assume its engaged position. This is inconvenient because it will then be necessary to keep pressing the adjusting piece and simultaneously rotate the U-shaped handle about the support rods. This adjustment operation is further deemed somewhat complicated for children to accomplish by themselves.

To mitigate and/or obviate the above-mentioned drawback, the present invention provides an improved cog member and an adjusting piece which cooperate each other in such a manner that the adjusting piece is rotated instead of pressed and can be released at any desired position, particularly the above-said released position, without the need to keep manually pressing the adjusting piece. With this design, the manipulation of the adjusting piece and the pivotal movement of the handle relative to the support rods can be separately performed.

SUMMARY OF THE INVENTION

Accordingly, it is an object of this invention to provide a handle assembly of the type comprising a pair of support rods, a handle, a spring-biased cog member between an end of the handle and the support rod, and an adjusting piece in which a manipulation of the adjusting piece to urge the cog member, in order to permit a pivotal movement of the handle relative to the support rods, can be intermittently performed, i.e., without the need to keep pressing the adjusting piece.

A further object of this invention is to provide a handle assembly of the above type in which the manipulation of the adjusting piece to urge the cog member is achieved by a rotational movement instead of a translational movement.

Another object of this invention is to provide a handle assembly of the above type in which the pivotal movement of the handle relative to the support rods can be performed in an easy and convenient manner.

These and additional objects, if not set forth specifically herein, will be readily apparent to those skilled in the art from the detailed description provided hereinbelow, with appropriate reference to the accompanying drawings.

BRIEF DESCRIPTION OF THE DRAWINGS

FIG. 4 is a view similar to FIG. 2 with the handle assembly being shown in a released position;

FIG. 5 is a cross-sectional view taken along line 5—5 in FIG. 4;

DETAILED DESCRIPTION OF THE PREFERRED EMBODIMENT

Figure 1:
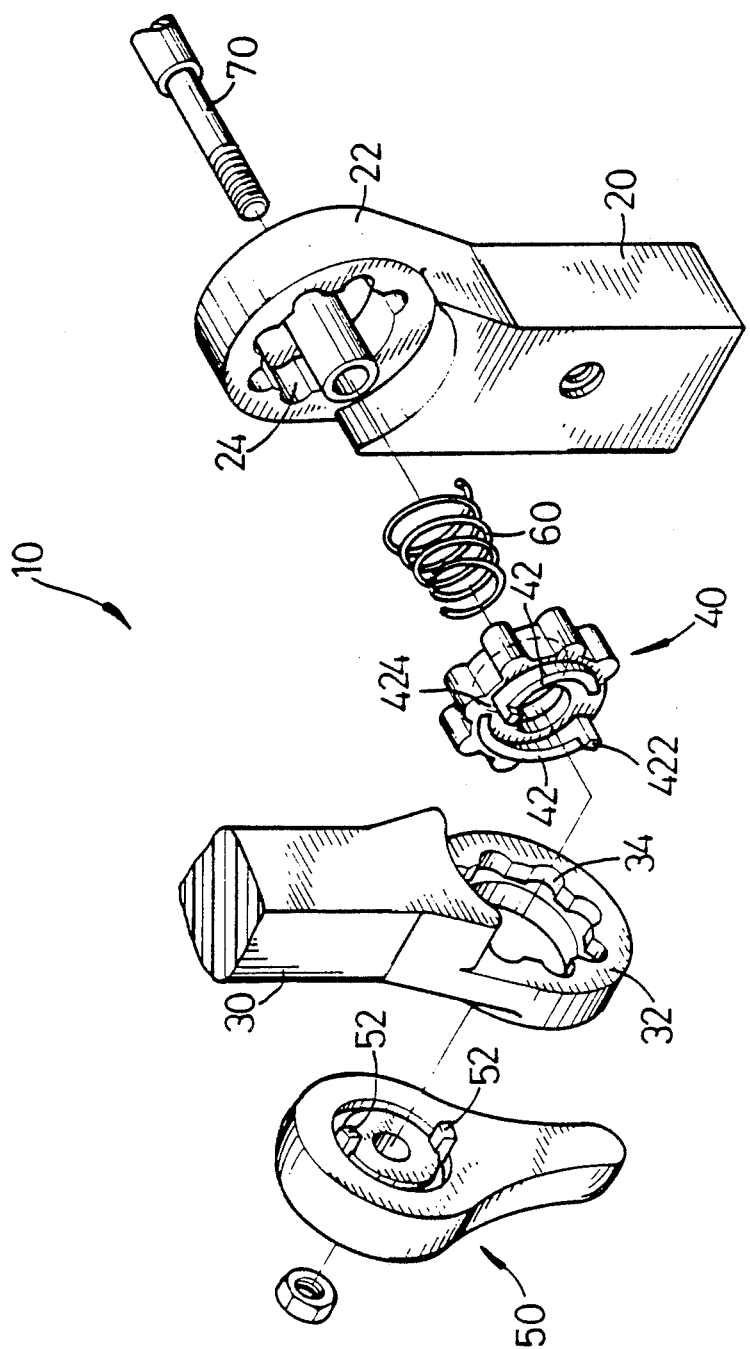
FIG. 1 is an exploded perspective view of a handle assembly constructed in accordance with the present invention.
Figure 7:
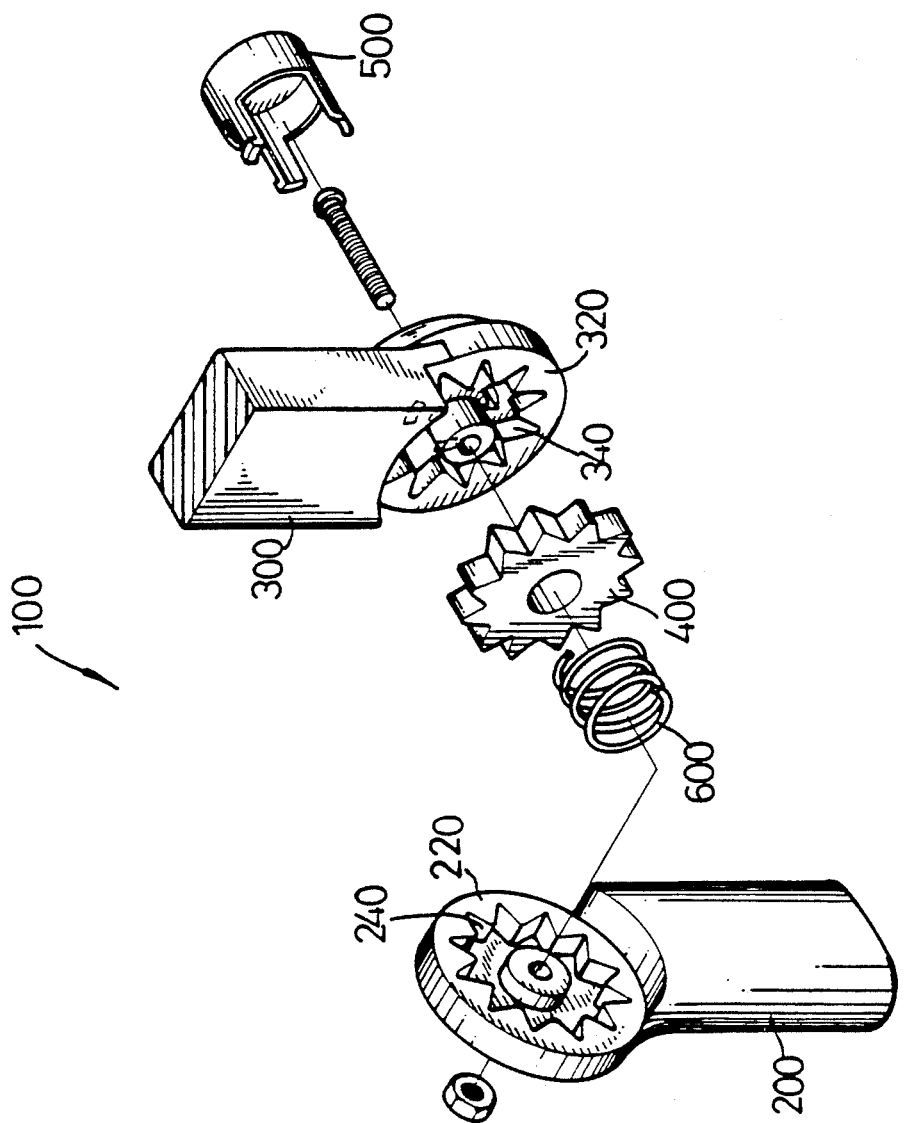
FIG. 7 shows a prior art handle assembly.

Referring now to the drawings, and more particularly to FIGS. 1 and 7, which respectively show a prior art handle assembly, generally designated by reference numeral 100, and a handle assembly of the present invention, generally designated by reference numeral 10. The prior art handle assembly 100 comprises a pair of support rods 200 (only one is shown in the drawing) each having a first pivot head 220, a generally U-shaped handle 300 having a pair of second pivot heads 320 (only one is shown), a cog member 400, and an adjusting piece 500. The first and second pivot heads 220 and 320 each define a first cog seat 240 and a second cog seat 340, respectively. The cog member 400 is disposed between the first and second cog seats 240 and 340 and is biased by a spring 600 to normally assume an engaged position where the U-shaped handle 200 is prevented from a pivotal movement with respect to the support rods 200. The adjusting piece, which is secured to the handle 300, is manipulatable to move the cog member 200 to disengage from the cog seat 240 of the handle 300 and assume a released position. In this released position, the U-shaped handle 300 is pivotal about the support rods 200.

In the handle assembly 10 of the invention shown in FIG. 1, the pair of support rods 20 (only one is shown) with the first pivotal head 22 thereof and the U-shaped handle 30 with the second pivotal head 32 thereof are substantially similar to those found in the prior art handle assembly, thus a detailed description therefor is not necessary. The improvement of the handle assembly 10 in accordance with the present invention will be described hereinbelow.

As can be clearly seen in FIG. 1, the handle assembly 10 of the invention comprises a substantially cylindrical cog member 40 having a pair of annular wedges 42 on a side surface thereof. The annular wedges 42 are diametrically symmetrical about a central axis of the cog member 40, expanding slightly less than 90 degrees, and are spaced from each other. The annular wedges 42 have a respective upper slanted surface, tapering toward an opposite direction, so that a rotational movement of any diametrical line passing the pair of annular wedges 42 along the upper slanted surface will move parallelly toward or away from the side surface of the cog member 40. The annular wedges 42 further have a respective stop 422 on a vertice thereof, which will be described later.

Figure 3:
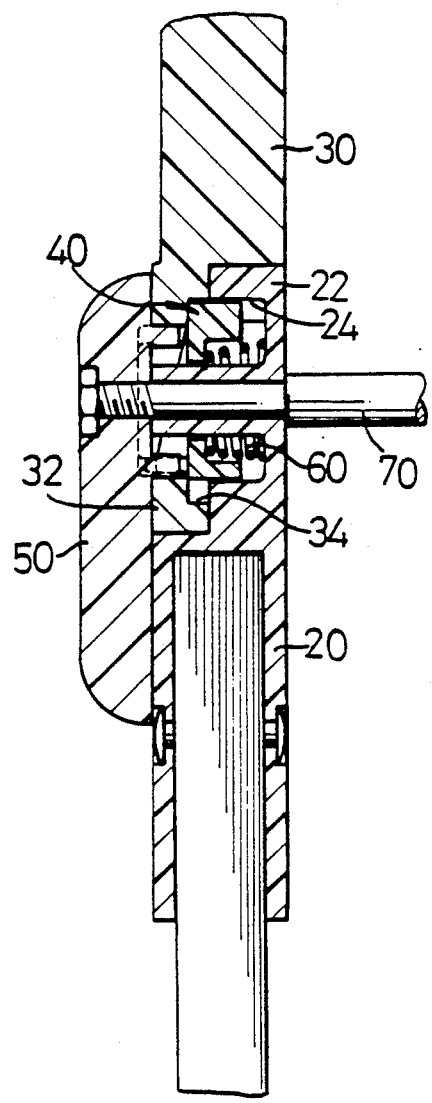
FIG. 3 is a cross-sectional view taken along line 3—3 in FIG. 2.

The first pivot head 22 of the support rod 20 comprises a first cog seat 24 adapted to receive the cog member 40 and having a depth slightly larger than a width of the cog member 40. The second pivot head 32 of the handle comprises a second cog seat 34 also adapted to receive the cog member 40 and having a depth approximately half the width of the cog member 40. Thus, with the first and second pivot heads 22 and 32 being disposed proximate to each other, the cog member 40 is normally biased toward the second cog seat 34 of the handle 30 by a spring 60 provided within the first cog seat 24 and will engage both the first and second cog seats 24 and 34. In this configuration, as shown in FIG. 3, a relative pivotal movement between the handle 30 and the support rods is prevented. To permit a pivotal movement of the handle 30 with respect to the support rods 20, the cog member 40 has to be moved into the first cog seat 24 on the support rod 20, resisting the force from the spring 60, by an adjusting piece 50.

The substantially tear-drop shaped adjusting piece 50 is rotatably mounted proximate to the handle 30 and has a pair of ridges 52 on a side opposite to the cog member 40. The diametrically disposed ridges 52 are each constantly in alignment and contact with a corresponding annular wedge 42, so that the ridge 52 will always track along the slanted surface of the annular wedge 42 in response to a rotational movement of the adjusting piece 50. As described above, a turning movement of the adjusting piece 50 about a connecting rod 70, to which the handle 30 and the adjusting piece 50 are mounted to, results in the ridges 52 sliding on the annular wedges 42, which may urge the cog member 40 to disengage from the second cog seat 34 of the handle 30, thus permitting a pivotal movement of the handle 30 about the supports 20. During the turning movement of the adjusting piece 50, even if the force required to rotate the adjusting piece 50 is only applied thereto temporarily or is entirely removed, the adjusting piece 50 will not be forced back by the spring-biased cog member 40, because the friction force between the ridges 52 and the slanted surfaces of corresponding wedges 42 is sufficiently large. With the above construction and arrangement, it is clear that in order to adjust or pivot the handle 30 about the support rods 20, it is not necessary to keep manipulating on the adjusting piece 50, Instead, the adjusting piece 50 of the invention is initially turned manually to move the cog member 40 to a released position in order to be disengaged from the second cog seat 34 of the handle 30, and then the turning force can be released. Next, the handle 30 can be pivoted about the support rods 20, without having to be simultaneously operating on the adjusting piece 50.

Referring now to the assembled construction of the handle assembly shown in FIGS. 2 through 5, FIG. 2 shows the adjusting piece 50 having a narrowed end pointing downward. From the cross-sectional view shown in FIG. 3, it is clear that at this position the pair of ridges 52 are aligned with a respective gap 424 formed between the spaced annular wedges 42 (cf. FIG. 1), and the cog member 40 is urged by the spring 60 to engage between the first and second cog seats 24 and 34. It is noted that in the engaged position, the cog member 40 may either bear against a peripheral bottom of the second cog 34 seat by a periphery thereof or directly bear against the pair of ridges 52 of the adjusting piece 50, depending on the length or height of the ridge 52.

Figure 2:
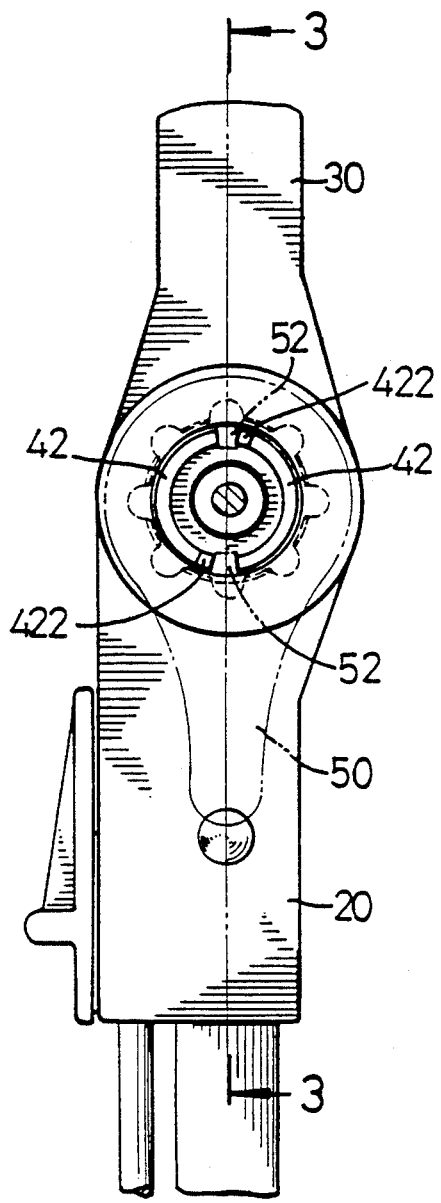
FIG. 2 is an assembled view of the handle assembly in FIG. 1, shown in an engaged position.

FIG. 4 shows the handle assembly 10 of the invention in a position where, with respect to FIG. 2, the adjusting piece 50 is rotated slightly less than 90 degrees in a counterclockwise direction, and the ridges 52 thereof are finally blocked from a further rotation by the stop 422 on the annular wedge 42. In this position, the cog member 40 is urged into the first cog seat 24 by the interaction of the ridges 52 and the annular wedges 42, thereby disengaging from the second cog seat 34, as clearly shown in FIG. 5. The handle 30 can now be freely pivoted about the support rods 20. From the above description, it is apparent that in FIG. 2 that adjusting piece 50 can not be turned in a clockwise direction, while in FIG. 4 the adjusting piece 50 can not be turned in a counterclockwise direction.

Figure 6:
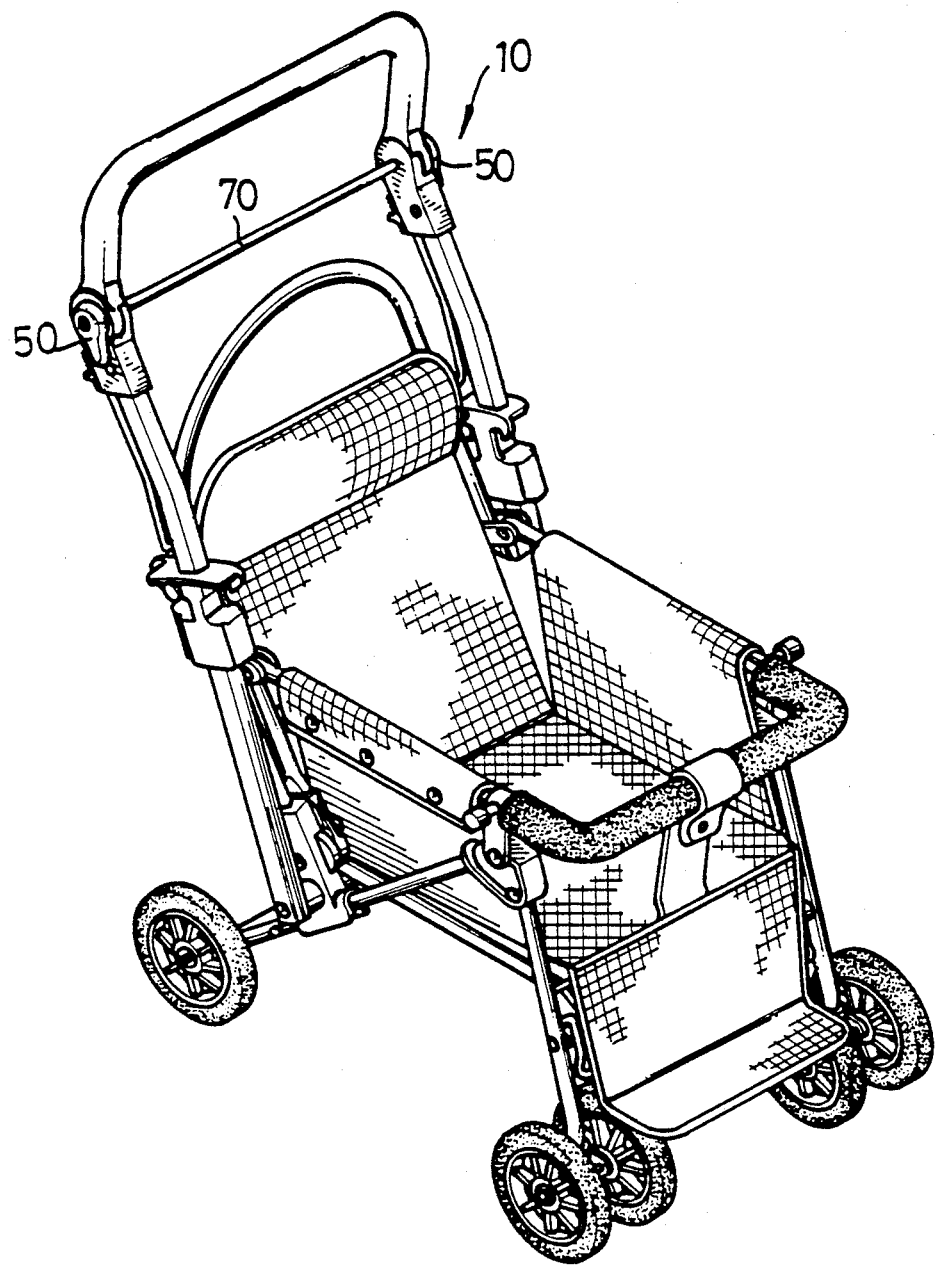
FIG. 6 illustrates an example of a doll carriage which incorporates the handle assembly of the invention.

FIG. 6 illustrates an example of a doll carriage which incorporates the handle assembly 10 of the invention. It is noted that the connecting rod 70, to which the handle 30 and the adjusting piece 50 are mounted to, further aids in stabilizing and reinforcing the construction of the invention.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as shall fall within the scope of the appended claims.

I claim:

1. In a handle assembly for a doll carriage of the type comprising a pair of support rods each having a first pivot head defining a cog seat; a substantially U-shaped handle having a pair of second pivot heads each defining a second cog seat; a spring-biased cog member disposed between the first and second cog seats, the cog member being constantly biased by a spring to assume an engaged position where the U-shaped handle is prevented from a pivotal movement with respect to the support rods, and being urgeable to assume a released position where the U-shaped handle is pivotal with respect to the support rods; and an adjusting piece operable to move the cog member from the engaged position to the released position, the improvement comprising:

said cog member having a pair of annular wedges diametrically spaced from each other; and said adjusting piece having a pair of ridges on a side opposite to said cog member, each said ridge being constantly in contact with a corresponding annular wedge so that said ridges track along a respective slanted surface of said annular wedges in response to a rotational movement of said adjusting piece, thereby urging said cog member from the engaged position to the released position while simultaneously preventing said spring-biased cog member from assuming the engaged position.

2. The handle assembly as claimed in claim 1, wherein said annular wedges on said cog member each have a stop on a vertice thereof so that said adjusting piece is blocked when said cog member is moved to the released position.

3. The handle assembly as claimed in claim 1, wherein said adjusting piece is substantially tear-drop shaped to define a narrowed end for easy manipulation by hands.

4. The handle assembly as claimed in claim 1, wherein each ridge of said adjusting piece has an upper slanted surface so configured as to contact said slanted surface of said wedge.

* * * * *